United States Patent
Hawkins et al.

[11] Patent Number: 5,960,487
[45] Date of Patent: Oct. 5, 1999

[54] DRY TOILET

[76] Inventors: Robert D. Hawkins; James A. Hawkins, both of Atlanta, Trent Lock, Nottingham, United Kingdom, NG10 2FY

[21] Appl. No.: 08/894,916
[22] PCT Filed: Mar. 13, 1995
[86] PCT No.: PCT/US95/03004
  § 371 Date: Sep. 2, 1997
  § 102(e) Date: Sep. 2, 1997
[87] PCT Pub. No.: WO95/24853
  PCT Pub. Date: Sep. 21, 1995

[30]   Foreign Application Priority Data

Mar. 16, 1994 [GB] United Kingdom .................... 9405323

[51] Int. Cl.⁶ .................................................. A47K 11/02
[52] U.S. Cl. .................................................. 4/449; 4/484
[58] Field of Search ................................ 4/449, 479, 483, 4/484, 452, 471, 472, 473, 476, 477, 478, 480, 482

[56]   References Cited

U.S. PATENT DOCUMENTS

| | | | |
|---|---|---|---|
| 479,897 | 9/1892 | Murphy | 4/449 |
| 585,637 | 6/1897 | Zimmerman | 4/449 |
| 2,205,405 | 6/1940 | Harm | 4/449 |
| 2,983,090 | 5/1961 | Harm | 4/449 |
| 3,619,822 | 11/1971 | Carmichael | 4/484 |
| 3,665,522 | 5/1972 | Backlund et al. | 4/484 |
| 3,878,572 | 4/1975 | Eriksson | 4/484 |

FOREIGN PATENT DOCUMENTS 2211880  9/1973  Germany .................................... 4/484

*Primary Examiner*—Charles R. Eloshway

[57]   ABSTRACT

A dry toilet uses a substantially continuous sheet of disposable bowl lining material to convey the toilet waste out of the toilet bowl for disposal. The sheet is supplied folded on a roll and is transported by a conveyance apparatus concealed within the rim of the toilet bowl.

6 Claims, 4 Drawing Sheets

DRY TOILET

TECHNICAL FIELD

This invention relates to improvements in dry toilets and particularly to dry toilets with disposable bowl lining material. Dry toilets have no water to convey waste away or to clean toilet surfaces and therefore various earlier patents describe bags or tubes or sheets to fit within a dry toilet to contain the waste or to convey the waste to a place of storage or disposal.

BACKGROUND ART

Toilets using a vertically fed flexible tube to line the bowl have been described in UK patent specification GB 1,525,613 and GB 2,160,417. In these references the tube used to line the toilet bowl is stored as a folded ring around the outside of the toilet bowl which is sequentially unfolded as the tube is pulled over the rim and down inside the bowl. The tube is pinched or sealed closed at the bottom of the bowl to contain the waste and also to prevent odors escaping from the previously used lower portion of the tube that has been deposited beneath the bowl.

This method of lining a toilet with a vertical tube has disadvantages which have limited the commercial exploitation of toilets employing this principle. An excess of tube material is required for each flush which makes the toilet expensive to operate. To be folded and stored outside the bowl, the tube diameter has to be much larger than the effective inside diameter of the bow. This surplus of material makes large folds which project within the bowl thus reducing the bowl volume and causing the soiling of surfaces much closer to the seat than one expects from a conventional toilet. Furthermore, whereas a very thin material would be adequate to protect bowl surfaces, the tube material has to be relatively thicker to contain the waste in an odor free manner and to prevent leakage while it is stored below the toilet. The combination of excess thickness and excess diameter limits the amount of tube material that can be stored in the small space around the toilet bowl thus requiring the toilet to be restocked at more frequent intervals than would normally be desired. Also, the storage of tube material around the toilet results in having to locate the bowl and the seat further back from the front of the toilet enclosure making it uncomfortable for short people and children to sit on.

Another disadvantage of the vertical tube toilet is that the total height required for the bowl, the feeding and sealing mechanism beneath the bowl and the storage space below that is greater than the height of a conventional toilet and, therefore, in practice toilets of this type often project below the floor which prohibits their use as portable appliances and makes removal of the waste more difficult.

A type of dry toilet which uses a disposable sheet to receive and remove the toilet waste and which avoids the disadvantages of the tubular bag toilet such as the excessive vertical height and the limited space for liner supply has been described by HARM in U.S. Pat. No. 2,205,405 with subsequent improvements described in U.S. Pat. No. 2,983,090. This toilet uses a continuous rectangular sheet supplied from a roll positioned horizontally below the toilet bowl. The flat sheet is pulled from the roll and over the upper lip of the toilet bowl and then through the bowl space. As the sheet progresses across the bowl space the opposed edges of the sheet are brought together and joined between a pair of rollers that grip the edges of the sheet and also serve to pull the sheet through the bowl space. This action folds the flat sheet in half and results in the formation of a wedge shaped container within the bowl space. The dimensional restraints that are necessary to form this type of wedge shaped container results in a toilet bowl space which is unusually shallow and overly wide at one end and very narrow at the other end. These restrictions on depth and width can be unpleasant to persons use to conventional toilets. To increase the effective depth of the bowl space to an acceptable level the toilet rim above the bowl space is shown to be unusually high and this will result in soiling the rim which is not protected by the liner sheet. This is particularly so at the narrow end where the width of the bowl space is less than the width of the opening in the toilet seat.

The wedge shaped container and its associated mechanism results in an awkwardly dimensioned enclosure for installation and use in conventional toilet rooms. As can be seen in U.S. Pat. No. 2,205,405 if the toilet is installed parallel to a wall it would be necessary for the user to sit at a 45 degree angle. In U.S. Pat. No. 2,983,090 this has been corrected but to make room for the drive mechanism much greater distance is required from the back wall than is desirable, particulary in public transport applications where toilet space is very limited. This configuration also requires the seat of the toilet to be set back from the edge of a bench type enclosure. For extra comfort and cleanliness it is desirable that the bowl and seat protrude forward from the enclosure and this is not possible with this type of toilet mechanism.

Another disadvantage of this type of toilet is the inherent difficulty of installing a new roll of liner sheet or replacing a torn liner sheet. In both situations it is necessary to disassemble the toilet enclosure and manually thread the liner sheet from the roll and through the guides and into the pulling mechanism, a process requiring the skill of a trained person and sufficient extra room space for the disassembly process.

DISCLOSURE OF INVENTION

The limitations that are inherent in the design of the foregoing sheet lined toilet can be overcome by the present invention which also uses a substantially continuous, rectangular liner sheet with two substatially continuous side edges. Instead of entering the bowl space flat, horizontal and unfolded, as described by HARM, the sheet is prefolded and then introduced into the bowl with the side edges aligned and in close proximity to each other. A vertically aligned channel in the side of the bowl provides an entranceway for the sheet into the bowl. If wound on a roll the sheet can be folded with the two side edges aligned at one end of the roll. These edges are then independently gripped at the entranceway by a conveyance apparatus located in the rim of the bowl. The conveyance apparatus has two separate pathways which seperate and unfold the two edges of the sheet as they enter the bowl and can bring them together again as they exit the bowl. This makes it practical to line a toilet bowl having the conventional depth and shape most people prefer and to do so with a small depth of unprotected rim surface which is hidden under the seat and out of the way of splashed waste. By starting at the entranceway the conveyance apparatus allows a new liner supply to be threaded through the bowl from the entrance side without disassembling the toilet enclosure. In the event of a tear in the liner sheet the conveyance apparatus, which provides an esseatally continuous grip on the edges of the liner sheet, will automatically remove the torn section and replace it with new material.

Positioning the liner supply on one side of the toilet bowl and the waste disposal space on the other side of the bowl and thereby moving the liner sheet transversly through the toilet bowl results in much less mechanical structure in front and behind the toilet bowl. This allows the bowl and its seat to extend in front beyond the enclosure for greater comfort and cleanliness and for the back of the toilet to be positioned closely against a wall of the toilet room and thus occupy a minimum of the available floor space.

Therefore, according to a preferred aspect of the present invention there is provided a dry toilet with disposable lining comprising; liner material in the form of a substantially continuous length of rectangular sheet having two substantially continuous side edges, a toilet bowl with walls adapted by means of a side entrance channel and a side exit channel for the transverse passage of the sheet through the bowl, the sheet being folded before entering the bowl through the side entrance channel, the two substantially continuous side edges of the sheet being aligned and in close proximity to each other before entering the bowl through the side entrance channel, a conveyance apparatus deployed around the perimeter of the bowl having means for holding, advancing, separating and releasing successive portions of the side edges of the sheet and thereby unfolding the lining sheet to form an open container within the toilet bowl for the receipt of toilet waste and a means of actuating the conveyance apparatus to advance the sheet a horizontal distance that will cause the container portion once soiled to be removed from the bowl through the side exit channel and to be replaced with a clean portion of sheet entering the bowl through the side entrance channel.

The dry toilet would ordinarily be provided with an enclosure beyond the exit channel into which the soiled sheet passes for disposal after being released by the conveyance apparatus, the passageway into the enclosure being equipped with a closure means to prevent the escape of odors when the sheet is not in motion, and further provided with a cover adapted for a toilet seat and to enclose, protect or support the operating components. To assist the sheet to closely conform to the shape of the bowl further means can be provided for exhausting air from within the bowl beneath the sheet.

The conveyance apparatus might, for example, comprise two slate but synchronised and horizontally supported belt drives, each belt transporting one edge of the sheet and each belt traversing one half of the toilet bowl rim, a series of pulleys and guides to constrain the belts to follow the prescribed path, short pins projecting at intervals from the outer surface of the belts to penetrate and hold the edge of the sheet, said pulleys and guides on the outer suface of the belt having grooves to clear the projecting pins while pressing the edges of the sheet against the belt, a tensioning means to assist the accurate alignment of the edges of the sheet when engaging with the belt drive, brackets to support the conveyance apparatus in alignment with the toilet bowl, other transmission, linkage and controls as might ordinarily be required to propel the conveyance apparatus by mechanical lever or electric motor and a fan or bellows may be required to exhaust air from beneath the toilet bowl lining sheet Although the foregoing disclosure describes a toilet with a bowl this invention is equally applicable to a type of toilet like the privy toilet or the compost toilet which has a seat over an open waste storage space. In these applications the container formed by the liner sheet beneath the seat serves to hide the waste stored below and to prevent the escape of odors.

BRIEF DESCRIPTION OF DRAWINGS

The invention will be further described by way of example only, with reference to the accompanying and purely diagrammatic drawings, in which.

BEST MODE FOR CARRYING OUT INVENTION

Figure 1:
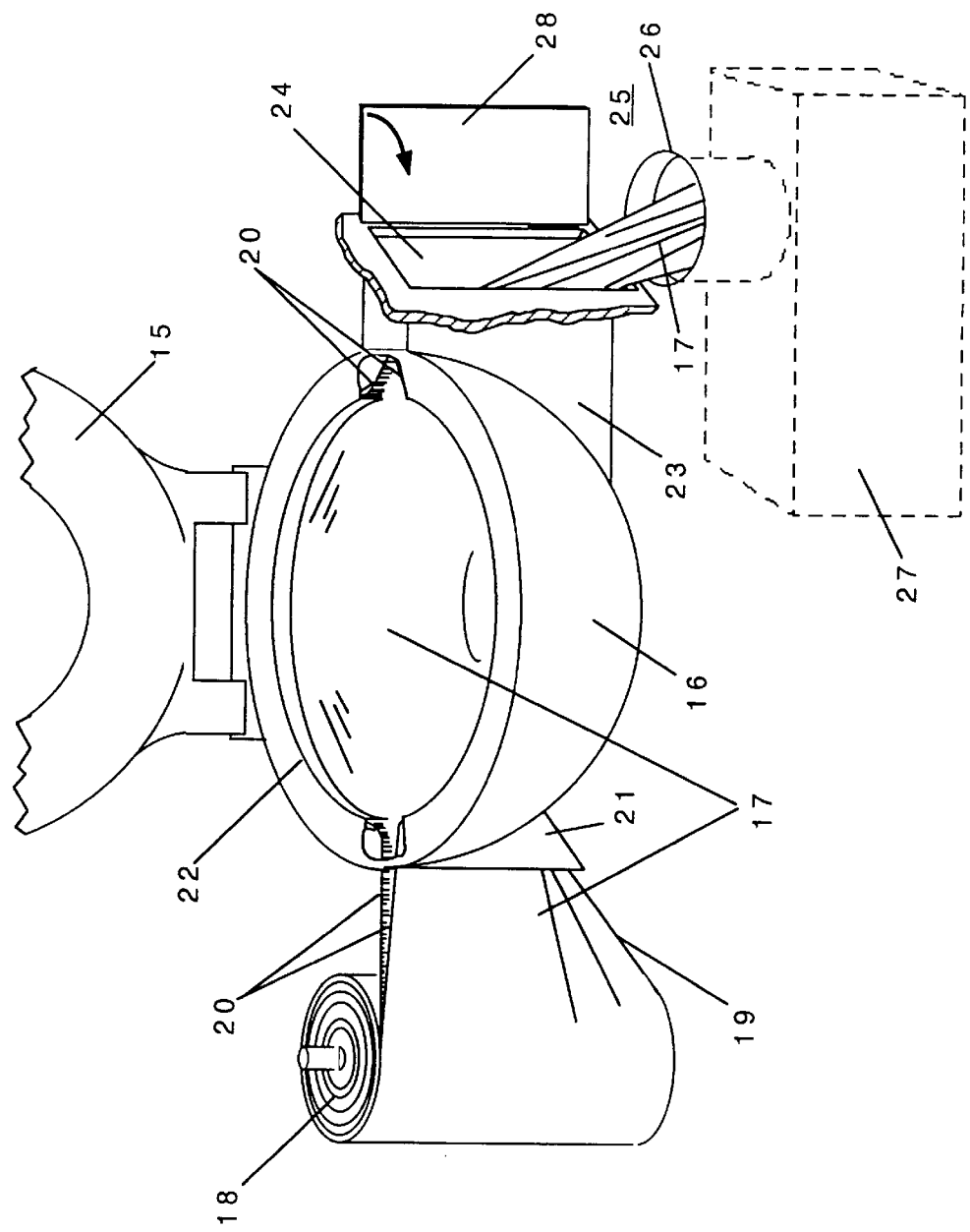
FIG. 1 is a simplified perspective view showing elements of the dry toilet which illustrate the principle of the invention.

The dry toilet shown in FIG. 1 has the toilet seat 15 raised to reveal the bowl 16 which is lined with a thin sheet 17 supplied from a roll 18. The sheet 17 is folded in the center. The fold 19 is lowermost and the edges 20 of the sheet 17 are uppermost when entering the side of the toilet bowl 16 through an entrance channel 21. At the top of the entrance channel the sheet edges 20 are separated by a conveyance apparatus which is concealed beneath the rim 22 of the bowl 16. The separated edges 20 are each conveyed around opposite sides of the rim 22 to an exit channel 23. In the middle of the bowl 16 the sheet edges 20 are widely separated which unfolds the sheet 17 and allows it to cover the sides and the bottom of the bowl 16. At the top of the exit channel 23 the edges 20 of the sheet are brought close together again by the conveyance apparatus and then released. After release, the sheet 17, assisted by gravity and possibly air flow, passes through an opening 24 into an enclosed space 25 and thence into a drain 26 leading to a container 27 where processing or removal of the waste together with the soiled liner sheet can be implemented.

To contain odors, the opening 24 can be kept closed by a door 28 except when the sheet 17 is being moved to empty the bowl 16 of waste. The door 28 could have a soft sealing gasket around its perimeter which when pressed against the thin liner sheet 17 would effect an air tight closure. Alternatively the door 28 might not be necessary if the container 27 was equipped with exhaust fan ventilation to the outside air as is often done with dry toilets. Air would then be drawn though the opening 24 and into the enclosure 25 which would prevent odors from escaping. The passage of the sheet 17 through the bowl 16 is further illustrated by reference to FIG. 2 which shows a section through the middle of the bowl and along the axis of the entrance channel 21 and the exit channel 23. To aid the draining of liquid wastes both the entrance channel floor 29 and the exit channel floor 30 slope downwards in the direction of the drain 26. This drainage slope prevents liquid waste from accumulating in the bottom of the bowl where it might otherwise result in splashing or where it could contaminate clean liner sheet 17 residing with the entrance channel 21. The drainage slope also allows the bowl to be easily washed and rinsed in the unlikely event that the lining sheet becomes damaged and leaks.

Figure 2:
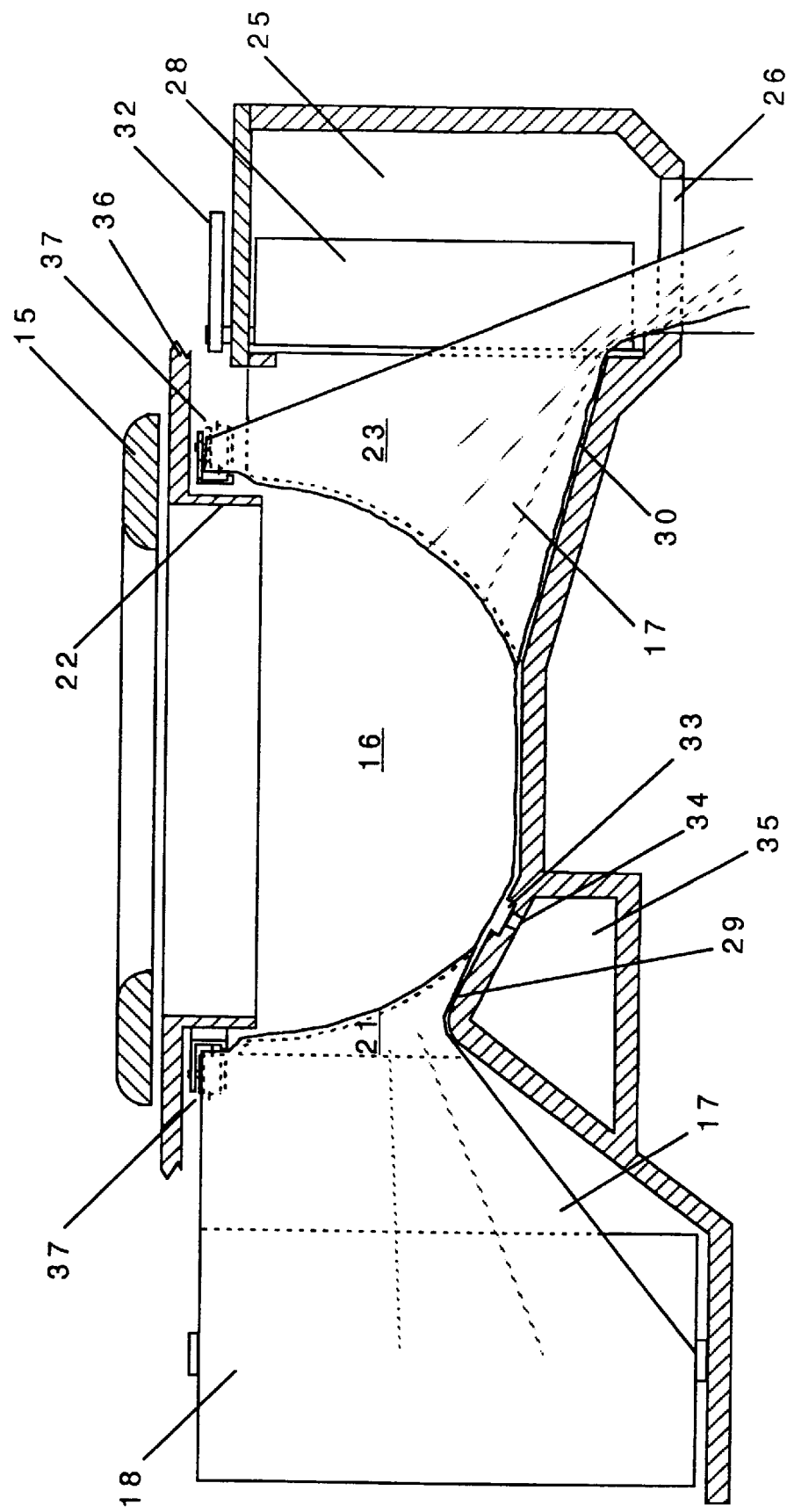
FIG. 2 is a front section elevation through the toilet bowl.
Figure 3:
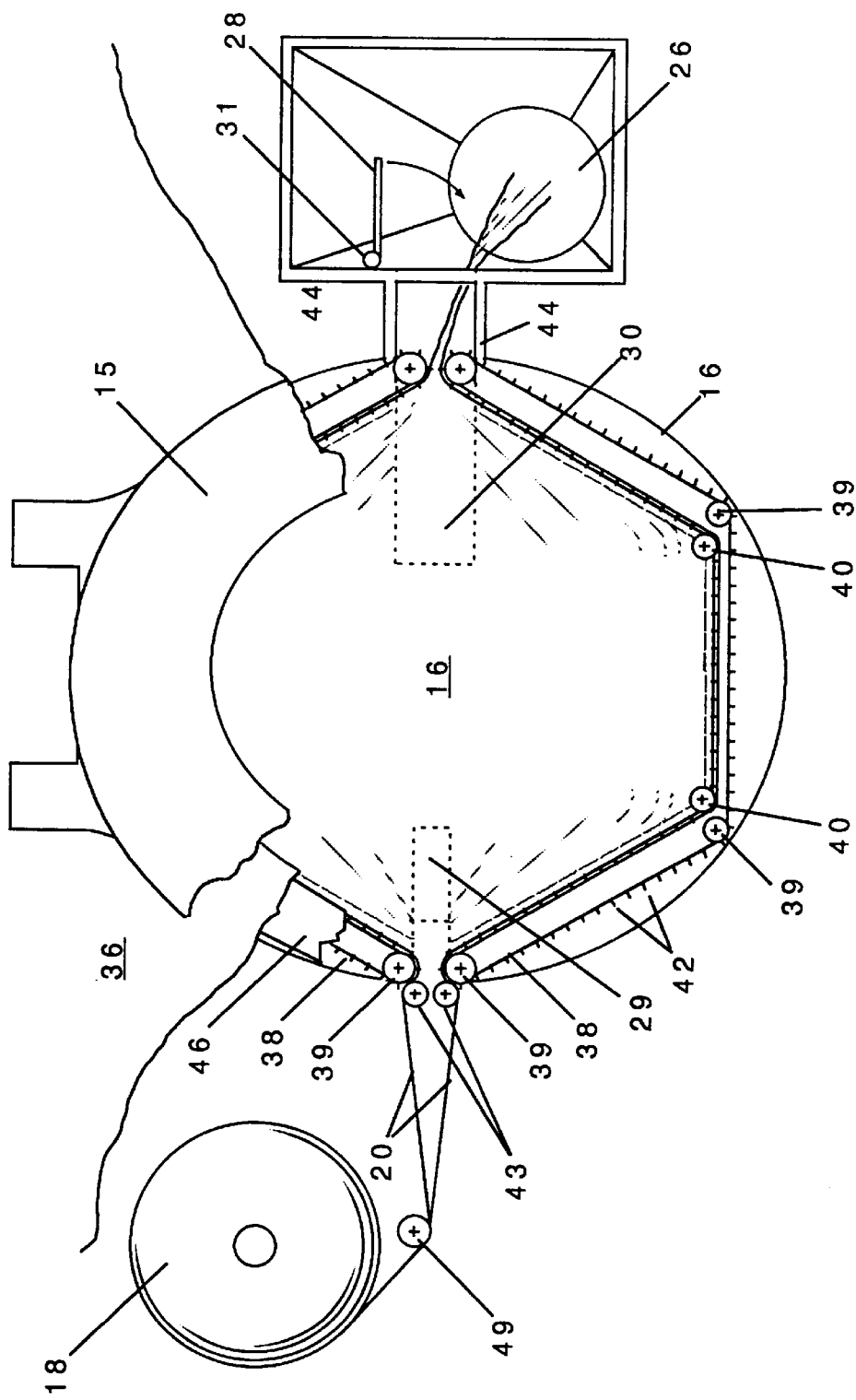
FIG. 3 is a top view of the toilet with covers partly removed to show a liner conveyance apparatus.

By referring to FIG. 3, the positions of entrance channel floor 29 and the eixt channel floor 30 can be seen within the bowl 16. The entrance channel floor 29 need only be wide enough to clear the passage of the sheet 17 whereas the exit channel floor 30 must be wider in order to clear the passage of the soiled sheet containing solid waste. The door 28 is hinged on a shaft 31 which, as further illustrated in FIG. 2, can project through the upper wall of the enclosure 25 and connect to a control arm 32. The control arm 32 can be linked to the toilet operating mechanism to open the door 28 when the toilet is being emptied.

Referring again to FIG. 2, indentions 33 have been provided in the inner surface of the bowl 16 leading to exhaust holes 34 connecting through the wall of the bowl to a duct 35 wherein air pressure can be lowered by the action of a bellows or fan to cause the liner sheet material 17 to be sucked against the surface of the bowl 16. Such vacuum suction need only to be applied momentarily and would normally be relieved when the liner sheet is being conveyed through the bowl.

Also, in FIG. 2 the seat 15 is shown lowered and resting on the rim 22 which has been made integral with the cover 36 to conceal the conveyance apparatus 37 as well as other working components of the toilet.

A conveyance apparatus which could transport the sheet 17 around the perimeter of the bowl 16 will be described with reference to FIGS. 3, 4 and 5. Two synchronised timing belts 38 each forming a return loop are guided and driven along the perimeter of the bowl by timing belt pulleys 39. The belts are further guided on their outside surfaces by pulleys 40. A radial groove 41 provides clearance for the pins 42 which project from the outside surface of the belts 38 to pierce and hold the edges 20 of the sheet 17. Two other similarly grooved pulleys 43 located at the top of the entrance channel 29 press the incoming edges 20 of the sheet onto the projecting belt pins 42. To help maintain even tension of the sheet 17 as it is being fed into the pulleys 43 a roller 49 is positioned so as to maintain alignment of the sheet edges 20 along the central axis. To control the supply tension of the sheet 17 a friction device or other mechanical braking device could be adapted to the supply roll 18 or its spindle. After being conveyed along the bowl perimeter the sheet 17 is forced off the pins 42 by the constraint of the exit channel walls 44.

Figure 4:
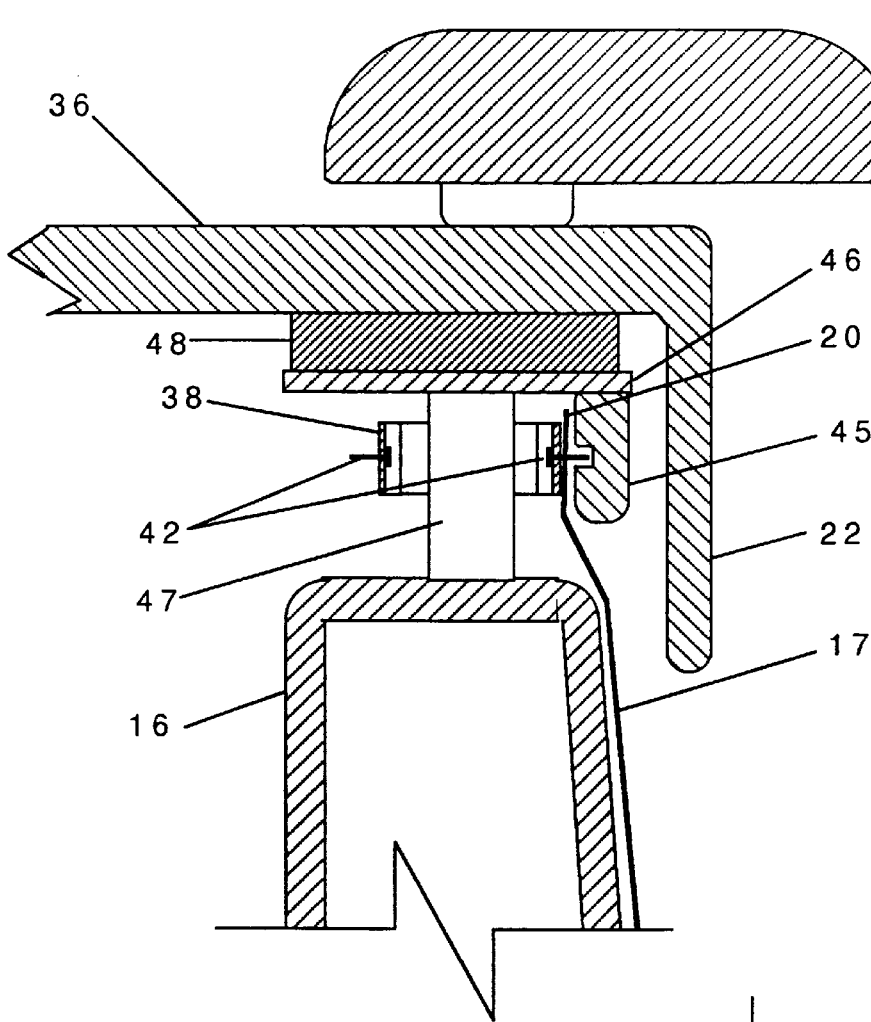
FIG. 4 is a section detail of part of the liner conveyance apparatus.
Figure 5:
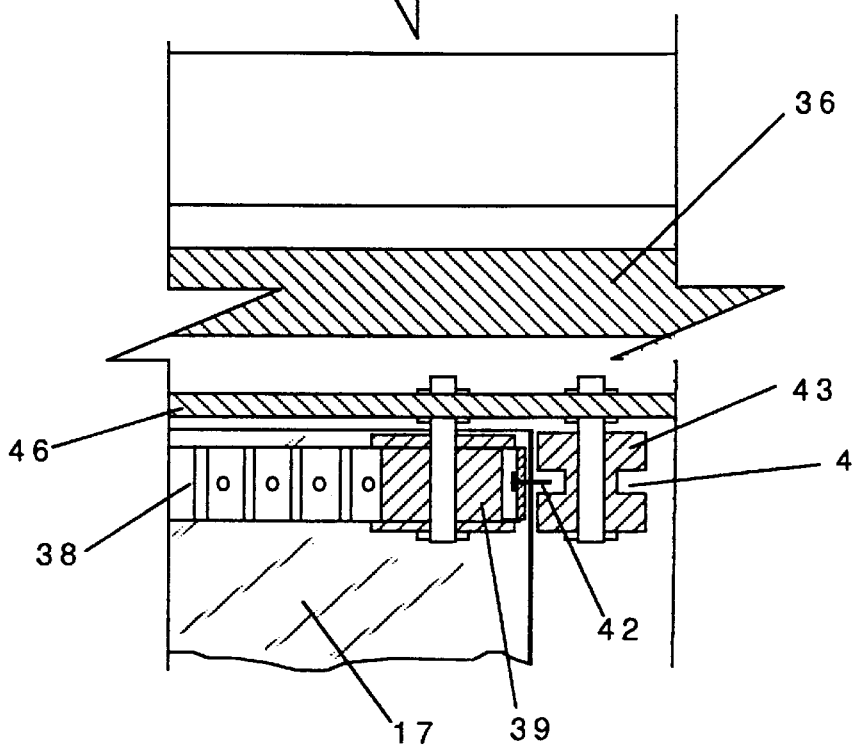
FIG. 5 is a section detail of another part of the liner conveyance apparatus.

Along portions of the belts 38 where there are no grooved pulleys 40 it may be desired to provide slotted guide surfaces 45, as shown in section in FIG. 4, to prevent the sheet edges 20 from being pulled off the belt pins 42. Alternatively, instead of guide surfaces additional grooved pulleys could be provided. Guide surfaces 45 and pulleys 39, 40 and 43 are supported on mounting brackets 46 which in turn are fastened to the top edge of the bowl by studs 47. The rim 22 combined with cover 36 rests on pads 48 on the upper surface of the mounting brackets 46 thus shielding the conveyance apparatus 36 from user interference and contamination.

The two belts 38 can be synchronised, for example, by linking their respective timing belt pulleys 39 located at the entrance channel 21 with matching spur gears. The spur gears could be located beneath the entrance channel floor 29 and connected by shafts to the belt pulleys 39 above. By similar additional mechanical linking the conveyance apparatus, the drain area door and the air exhaust means could be made to operate automatically with the force of a foot pedal or the power of a small electric motor.

We claim:

1. We claim a dry toilet with disposable lining comprising; liner material in the form of a substantially continuous length of rectangular sheet having two substantially continuous side edges, a toilet bowl with walls adapted by means of a side entrance channel and a side exit channel for the transverse passage of the sheet through the bowl, the sheet being folded before entering the bowl through the side entrance channel, the two side edges of the sheet being aligned and in close proximity to each other before entering the bowl through the side entrance channel, a conveyance apparatus deployed around the perimeter of the bowl having means for holding, advancing, separating and releasing successive portions of the side edges of the sheet and thereby unfolding the lining sheet to form an open container within the toilet bowl for the receipt of toilet waste and a means of actuating the conveyance apparatus to advance the sheet a horizontal distance that will cause the container portion once soiled to be removed from the bowl through the side exit channel and to be replaced with a clean portion of sheet entering the bowl through the side entrance channel.

2. We claim a dry toilet with disposable lining comprising; a toilet seat having an opening, a space below the opening to receive toilet waste, a supply of rectangular lining sheet, the sheet having a substantially continuous length with two substantially continuous side edges, a conveyance apparatus deployed beneath the toilet seat and around the seat opening, the conveyance apparatus having an input end and an output end and means for holding, advancing, separating and releasing successive portions of the side edges of the sheet and thereby shaping the sheet to form a bowl shaped container for the receipt of toilet waste beneath the seat, the lining sheet from the supply ending the conveyance apparatus at the input end and disengaging from the conveyance apparatus at the output end, the two side edges of the lining sheet being aligned and in close proximity to each other at the input end, and a means of actuating the conveyance apparatus to advance the sheet a horizontal distance that will cause the container portion once soiled to be removed from beneath the seat and to be replaced with a clean portion of sheet from the supply.

3. We claim a dry toilet with disposable lining according to claim 1 or 2 wherein the conveyance apparatus includes one or more guided belts having projecting points along the belt face which pierce and hold the edges of the sheet.

4. We claim a dry toilet with disposable lining according to class 1 or 2 wherein the soiled, container portion of the sheet is transported through an opening and into a disposal space, the opening having a closure means to restrict the escape of odors from the disposal space when the sheet is not being transported.

5. We claim a dry toilet with disposable lining according to claims 1 or 2 wherein the air is partially evacuated from at least a portion of a space below the sheet material to assist the sheet to form the open container.

6. We claim a dry toilet with disposable lining according to claims 1 or 2 wherein the rectangular lining sheet is supplied on a roll, the sheet being folded on the roll so that the two side edges of the sheet are aligned with each other and with one side of the roll.

* * * * *